US009016562B1

(12) United States Patent
Tredoux et al.

(10) Patent No.: US 9,016,562 B1
(45) Date of Patent: Apr. 28, 2015

(54) VERIFYING RELATIVE LOCATIONS OF MACHINE-READABLE TAGS USING COMPOSITE SENSOR DATA

(71) Applicant: Xerox Corporation, Norwalk, CT (US)

(72) Inventors: Gavan L. Tredoux, Penfield, NY (US); Peter J. Zehler, Penfield, NY (US); Premkumar Rajendran, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/109,303

(22) Filed: Dec. 17, 2013

(51) Int. Cl.
*G06F 17/00* (2006.01)
*G06K 5/00* (2006.01)

(52) U.S. Cl.
CPC ........................................ *G06K 5/00* (2013.01)

(58) Field of Classification Search
USPC .................................. 235/375, 435, 491, 492
See application file for complete search history.

(56) References Cited

U.S. PATENT DOCUMENTS

| 8,229,458 | B2 | 7/2012 | Busch |
| 8,321,922 | B1 | 11/2012 | Lo et al. |
| 8,325,044 | B2 | 12/2012 | Martinez de Velasco Cortina et al. |
| 2010/0148977 | A1 | 6/2010 | Tseng et al. |
| 2010/0299527 | A1 | 11/2010 | Arunan et al. |
| 2011/0248851 | A1 | 10/2011 | Pham |
| 2011/0313922 | A1 | 12/2011 | Ben Ayed |
| 2012/0052872 | A1 | 3/2012 | Do |
| 2012/0143495 | A1 | 6/2012 | Dantu |
| 2012/0202423 | A1 | 8/2012 | Tiedemann et al. |
| 2012/0290254 | A1 | 11/2012 | Thrun et al. |
| 2013/0132282 | A1 | 5/2013 | Shakkarwar |
| 2013/0185213 | A1 | 7/2013 | Insanic |

FOREIGN PATENT DOCUMENTS

| EP | 2 420 854 | 2/2012 |
| WO | 2013/072437 | 5/2013 |
| WO | 2013/121356 | 8/2013 |

*Primary Examiner* — Kristy A Haupt
(74) *Attorney, Agent, or Firm* — Gibb & Riley, LLC

(57) ABSTRACT

Methods and systems read a machine identification code from a machine using a portable computerized device. Such methods and systems automatically sense current environmental conditions of the location and automatically calculate a current location-based environmental signature based on the current environmental conditions sensed by the sensors. Also, such methods and systems automatically compare the current location-based environmental signature with a previously stored location-based environmental signature to verify whether the machine identification code is in the correct location based on a similarity measure being above a predetermined threshold, using the processor. Such methods also display a machine identification validity message on a graphic user interface of the portable computerized device based on the process of verifying the machine identification code determining that the machine identification code is in the correct location.

20 Claims, 5 Drawing Sheets

VERIFYING RELATIVE LOCATIONS OF MACHINE-READABLE TAGS USING COMPOSITE SENSOR DATA

BACKGROUND

Cross-Reference to Related Applications

This application is related to the following co-pending application filed concurrently herewith by the same Applicants and assigned to the same Assignee: "VIRTUAL MACHINE-READABLE TAGS USING SENSOR DATA ENVIRONMENTAL SIGNATURES", Ser. No. 14/109,106. The complete disclosure of this co-pending application is incorporated herein by reference.

Systems and methods herein generally relate to machine readable codes or tags (RFID, QR, NFC, Bluetooth, barcodes, etc.) used to identify equipment or features and verification systems.

Tags or identification codes can be maintained in wireless devices that can be read by equipment such as near field communication systems (NFC), radio frequency identification systems (RFID), and Bluetooth systems; and optical systems (barcodes, quick reference codes (QR) etc.) or similar systems. Such identification codes are commonly used to identify equipment and features or provide other information that is location-sensitive, and devices such as smartphones can read machine-readable tags.

There are many applications of such mobile-readable tags. However, the tags may be maliciously moved, or switched with another tag from another location. This may be used to fool users, thereby causing them to use the wrong tag information. Surrounding systems that rely on tags being read in the correct location where they were originally affixed may be compromised as a result. Absolute positioning systems like global positioning systems (GPS) are subject to obstructions, especially inside buildings where many pieces of equipment are located.

SUMMARY

Exemplary portable computerized devices herein comprise a wireless reader that reads a machine identification code from a machine identification code device of a machine while the portable computerized device is positioned at a location that is within a predetermined distance from the machine. The portable computerized devices include sensors operatively (meaning directly or indirectly) connected to the wireless reader. The sensors automatically sense current environmental conditions of the location of the machine. The portable computerized devices include a processor operatively connected to the sensors. The processor automatically calculates a "current location-based environmental signature" based on the current environmental conditions sensed by the sensors.

Also, the portable computerized devices include a communications device operatively connected to the processor. The communications device automatically obtains a previously stored "location-based environmental signature" associated with the machine identification code from a non-transitory computer readable storage medium. The processor automatically compares the current location-based environmental signature with the previously stored location-based environmental signature to determine a similarity measure of the current location-based environmental signature and the previously stored location-based environmental signature.

The processor automatically verifies whether the machine identification code is in the correct location based on the similarity measure being above a predetermined threshold, using the processor. The portable computerized devices further include a graphic user interface operatively connected to the processor. The graphic user interface displays a machine identification validity message based on the processor determining that the machine identification code is in the correct location.

Exemplary systems herein comprise a first portable computerized device and a set of computer-executable instructions. The first portable computerized device includes a first wireless reader (e.g., an optical reader, a magnetic reader, a radio-frequency reader, etc.) that reads machine identification code from a machine identification code device of a machine while the first portable computerized device is positioned at a location that is within a predetermined distance from the machine.

Further, the first portable computerized device includes first sensors operatively connected to the first wireless reader. The first sensors automatically sense present environmental conditions (e.g., the lighting level, the sound level, the temperature, the altitude, the barometric pressure, compass heading, a wireless signal strength, a wireless signal type, etc.) of the location that were present while installing or activating the machine identification code device that is attached to the machine.

The first portable computerized device includes a first processor operatively connected to the first sensors. The processor automatically calculates a previously stored location-based environmental signature based on the present environmental conditions sensed by the first sensors. The first portable computerized device includes a first communications device operatively connected to the processor. The first communications device automatically stores the previously stored location-based environmental signature in a non-transitory computer readable storage medium. When storing the previously stored location-based environmental signature the first communications device also associates the previously stored location-based environmental signature with the machine identification code of the machine.

The computer-executable instructions cause a second wireless reader of a second portable computerized device to read a possibly matching machine identification code from the machine identification code device of the machine while the second portable computerized device is positioned at a second location that is within the predetermined distance from the machine. The computer-executable instructions also cause second sensors of the second portable computerized device to automatically sense current environmental conditions of the second location.

The computer-executable instructions cause a second processor of the second portable computerized device to automatically calculate a current location-based environmental signature based on the current environmental conditions sensed by the second sensors. The computer-executable instructions cause a second communications device of the second portable computerized device to automatically obtain the previously stored location-based environmental signature associated with the possibly matching machine identification code from the non-transitory computer readable storage medium.

The computer-executable instructions cause the second processor to automatically compare the current location-based environmental signature with the previously stored location-based environmental signature to determine a similarity measure of the current location-based environmental signature and the previously stored location-based environmental signature. The computer-executable instructions also cause the second processor to automatically verify whether the possibly matching machine identification code is in a correct location based on the similarity measure being above a predetermined threshold. Further, the computer-executable instructions cause a second graphic user interface of the second portable computerized device to display a machine identification validity message based on the second processor determining that the possibly matching machine identification code is in the correct location.

In addition, if the second wireless reader fails to read the possibly matching machine identification code or the second processor determines that the possibly matching machine identification code is in an incorrect location, the computer-executable instructions can cause further processing. For example, the computer-executable instructions can cause the second processor and the second communications device to match the current location-based environmental signature to one of the previously stored location-based environmental signatures maintained in the non-transitory computer readable storage medium. The computer-executable instructions can also cause the second processor and the second communications device to obtain a valid machine identification code associated with the matching previously stored location-based environmental signature from the non-transitory computer readable storage medium. The computer-executable instructions can cause the second processor to output the valid machine identification code.

Various methods herein read a machine identification code from a machine identification code device of a machine, using a wireless reader of a portable computerized device, while the portable computerized device is positioned at a location that is within a predetermined distance from the machine. Such methods automatically sense current environmental conditions of the location, using sensors of the portable computerized device and automatically calculate a current location-based environmental signature based on the current environmental conditions sensed by the sensors, using a processor of the portable computerized device.

Also, such methods automatically obtain a previously stored location-based environmental signature associated with the machine identification code from a non-transitory computer readable storage medium, using a communications device of the portable computerized device. Further, such methods automatically compare the current location-based environmental signature with the previously stored location-based environmental signature to determine a similarity measure of the current location-based environmental signature and the previously stored location-based environmental signature, using the processor. These methods automatically verify whether the machine identification code is in the correct location based on the similarity measure being above a predetermined threshold, using the processor. Such methods also display a machine identification validity message on a graphic user interface of the portable computerized device based on the process of verifying the machine identification code determining that the machine identification code is in the correct location.

Additional methods herein include processes of installing or activating a machine identification code device attached to a machine. These methods read a machine identification code from the machine identification code device of the machine (using a first wireless reader of a first portable computerized device of the administrator or service engineer who does the initial set up of the machine identification code) while the first portable computerized device is positioned at a location that is within a predetermined distance from the machine.

Further, these methods automatically sense present environmental conditions (e.g., the lighting level, the sound level, the temperature, the altitude, the barometric pressure, compass heading, a wireless signal strength, a wireless signal type, etc.) of the location that were present while reading the machine identification code (using first sensors of the first portable computerized device) and automatically calculate a location-based environmental signature based on the present environmental conditions sensed by the first sensors (using a first processor of the first portable computerized device).

Then, such methods can automatically store the location-based environmental signature (referred to herein as the "previously stored" location-based environmental signature) in a non-transitory computer readable storage medium (computer storage) using a first communications device of the first portable computerized device. The process of storing the previously stored location-based environmental signature also includes a process of associating the previously stored location-based environmental signature with the machine identification code. This completes the initial setup process for the machine identification code device that is attached to the machine.

Once the initial setup process is complete, users will want to verify that the machine identification code is properly associated with the machine and has not been tampered with or moved. Therefore, these methods then read a possibly matching machine identification code from the machine identification code device of the machine, using a second wireless reader of a second portable computerized device, while the second portable computerized device is positioned at a second location that is within the predetermined distance from the machine.

These methods automatically sense current environmental conditions of the second location, using second sensors of the second portable computerized device and automatically calculate a current location-based environmental signature based on the current environmental conditions sensed by the second sensors, using a second processor of the second portable computerized device. Such methods also automatically obtain the previously stored location-based environmental signature associated with the possibly matching machine identification code from the non-transitory computer readable storage medium, using a second communications device of the second portable computerized device.

Thus, these methods can automatically compare the current location-based environmental signature with the previously stored location-based environmental signature to determine a similarity measure of the current location-based environmental signature and the previously stored location-based environmental signature, using the second processor. Then, such methods automatically verify whether the possibly matching machine identification code is in the correct location based on the similarity measure being above a predetermined threshold, using the second processor. Further, such methods can display a machine identification validity message on a second graphic user interface of the second portable computerized device based on the process of verifying the possibly matching machine identification code determining that the possibly matching machine identification code is in the correct location.

Further, these methods can refine the previously stored location-based environmental signature based on multiple current location-based environmental signatures obtained as the users perform multiple processes of verifying the possibly matching machine identification code.

If the process of reading the possibly matching machine identification code fails, or the process of verifying the possibly matching machine identification code determines that the possibly matching machine identification code is in an incorrect location, these methods can still obtain the correct machine identification code for the user. Specifically, these methods can match the current location-based environmental signature to one of a plurality of previously stored location-based environmental signatures maintained in the non-transitory computer readable storage medium, using the second processor and the second communications device. Thus, these methods obtain a valid machine identification code associated with the matching previously stored location-based environmental signature from the non-transitory computer readable storage medium, using the second processor and the second communications device and output the valid machine identification code from the second processor.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
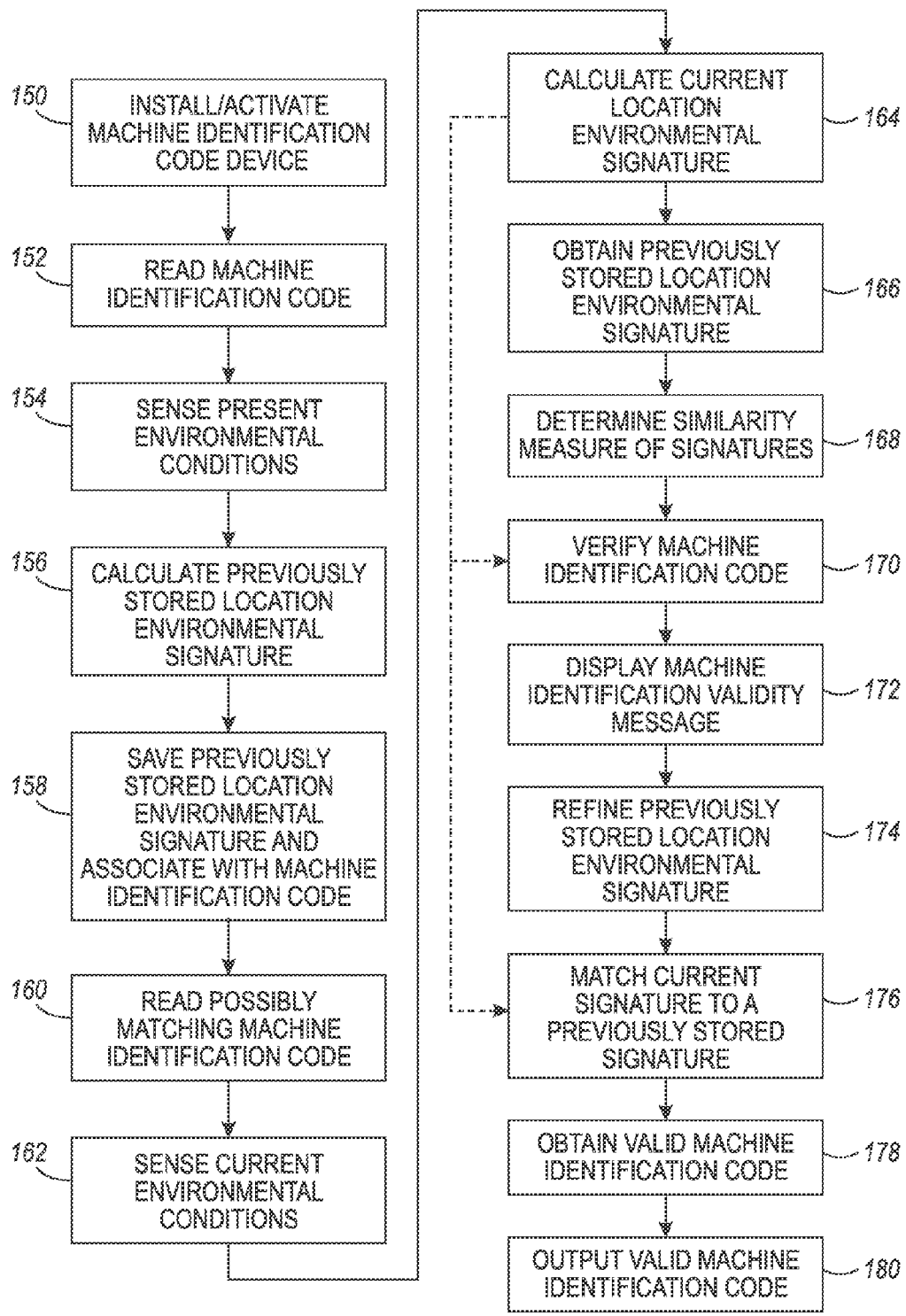
FIG. 1 is a flow diagram of various methods herein.

The systems and methods herein use a mobile device's sensors (Wi-Fi signal strength, compass readings, ambient light and noise, etc.) to create unique electronic signatures of current surroundings, and associate those with a tag identifier. For purposes herein, a "tag," "tag identifier," and "machine identification code" refer to any machine-readable item containing data or codes, such as near field communication systems (NFC) radio frequency identification systems (RFID), Bluetooth systems, optical systems (barcodes, quick reference codes (QR) etc.) or similar systems.

When the tag is initially placed into service, the mobile device reads the tag identifier, e.g. using NFC or optical systems, and simultaneously obtains a number of environmental characteristics detected by the mobile device's sensors. The systems and methods herein use such environmental characteristics to calculate and environmental signature that is then associated with that specific tag. Recording both the tag identifier and the signature, locally on the mobile or in a server, allows later verification that the tag is in the barometric pressure barometric pressure correct location by matching the current environmental signature against the previously stored environmental signature associated with the tag identifier. Probabilistic matching may be used in some different applications by systems and methods herein. In this way, switching or moving tags to mislead users can be detected, and the user can be warned that the tag appears not to be located where it was supposed to be, with a stated probability.

Tags that can be read by mobile devices have many applications. The tags take multiple forms, such as NFC/RFID tags, or Bluetooth tags, or printed tags like QR codes or other visually encoded forms. The tags may be read-only, or both readable and writeable. Such tags have unique identifiers that can be read. Typically, such tags are used for identification purposes when affixed to a position or object, and if additional assumptions are made about the fixity of their location, to infer that the user is in a definite spot when reading them and thus referring to a proximate object or asset, such as a multi-function printing device (MFD), a particular hallway door, a storage closet, or similar equipment. Alternatively, the tag may simply hold information about the proximate object such as its network address, associated servers and so on, and the user may want to read this information to pair with it.

One prominent kind of tag is the rewritable passive NFC tag. The reader and writer of such tags has to be physically close to the tag (say, less than 1 meter or similar distance limit) and the tag is passive in that the reader/writer supplies the power source, so that the tag can be affixed externally or internally without any other integration to a broad range of objects or places, e.g. to MFD devices.

The systems and methods herein provide assurance that a tag has not been moved or switched with some other tag from a different location. This prevents attempts to fool the user or the surrounding system using such a tag, say by misleadingly referring to an object that was not intended. Moving tags in this way is an emerging threat and could be used, in just one of many examples, to steal sensitive data by misdirecting unaware users to access or send data to unintended network locations.

In an oversimplified example, with systems and methods herein, one or more tags are affixed to objects. These may be complex devices such as MFDs, or anything else to which a tag can be affixed, such as doors, lights, monitors and so on. Immediately before or after being affixed to the objects (or activated if they are permanent features of the objects) the tags are "enrolled" using a mobile device, for example. The mobile device should be capable of reading identifiers from the tags. Also, data from the mobile device's various sensors is obtained by the mobile device and used to create a composite location signature (an n-tuple consisting of recorded sensor values). Many sensors commonly available on mobile devices include a magnetic compass, Wi-Fi (e.g., 802.11x, 3g/4g), microphone, camera, barometer, altimeter, thermometer, etc. Further refinement of the n-tuple may or may not be performed, depending specific implementation.

The mobile device can record the n-tuple value as the environmental signature (either locally using its own storage, or remotely on a server) and, at the same time, indicate where the tag is located.

After the tag is initially affixed (or activated) and the environmental signature is established, each time a user approaches a location containing a tag, the user can verify whether the tag is in the appropriate location. To do so, the user can employ an application (app), which is a set of computer instructions causing the processor of the user's mobile device to execute some or all of the instructions. In this example, the app would cause the processor of the mobile device to read the tag value, record as many of the environmental conditions as the mobile device is capable of obtaining to calculate a "current" n-tuple representing the current environmental signature.

Storing the associated environmental signatures on a server (or other common-access storage location) has the advantage of allowing mobile devices to collaborate in establishing and refining the n-tuples that represents the environmental signatures. For example, every time a mobile device utilizes the tag, the existing environmental signature may also be refined to reflect the latest environmental condition sensed by the most recent user(s), using an appropriate smoothing process (if desired).

The app then causes the processor of the mobile device to compare the current environmental signature with the previously stored environmental signature (by comparing the current n-tuple value with the previously stored (and possibly refined) n-tuple value associated with the tag read by the user's mobile device)).

The app thus causes the processor of the mobile device to determine whether or not the tag is likely to have been moved according to different levels of certainty. In one example, the app can cause the processor of the mobile device to assign a probability that the tag is incorrect and has potentially been moved. For example, the app causes the processor to perform various comparison analysis routines to assign such a probability, including for example discriminant analysis, logistic regression, support vector machines, regression trees and other methods based on calculating distance metrics in the n-tuple space, such as Mahalanobis distance. The systems and methods herein assign configurable tolerance to that probability, since being moved 1 cm may not be considered as important as being moved 1 mile.

This information is then presented to the user through the graphic user interface of the mobile device to allow the user to act on the information given. Perhaps the user may not care and may proceed to willingly use an incorrect tag, or perhaps the user may refuse to use the tag and inform security, or take some other action. The systems and methods herein thus provide the user accurate information about the probability that the tag was moved.

The information regarding whether a tag is in the correct location calculated by the systems and methods herein is only relative, and can be based solely upon the environmental signature associated with the tag, and does not need to be based on any specific geographic location information. This is contrasted to positioning systems such as GPS, which establish a geographic location that is comparable to other geographic locations on the longitude and latitude scales. Unobstructed access to satellite signals, which is problematic inside covered areas, makes it difficult to obtain accurate GPS-based geographic locations within buildings. The systems and methods herein use a much broader and more flexible determination of "location" (by matching current environmental signatures with previously stored associated environmental signatures) which does not need to be comparable except in the sense that one signature is not equal to another.

Further, the systems and methods herein support a heterogeneous collection of mobile devices that may have different sensors and sensor configurations. By having all the mobiles record tuples of data, the best matching tuple (with readings from the same or similar sensor repertoire) can be used for the current mobile device when matching. Thus, if a device does not have an altimeter, tuples recorded by devices without altimeters may be used in the matching process (or the altimeter portion of the tuple can be removed from the calculation).

In addition, for mobile devices that are not capable of reading tags, the systems and methods herein can match the current environmental signature to stored environment signatures to determine the associated tag for that store environmental signature. This allows systems and methods herein to grant access to mobile devices that are not capable of reading tags based upon the current environmental signature identified by the mobile device. Thus, the systems and methods herein can employ the same processing described here to read the tag value from a central location by matching the n-tuple calculated by the mobile device. If a unique tag is known to exist within the proximity of that tag, the tag contents can be transmitted to the mobile, and thus the mobile does not need to have the ability to read, for example, NFC tags since the current environmental signature calculated by the mobile device may suffice. This is a different application of the systems and methods herein, which does not determine whether the tag is valid but, instead, since the tag cannot be read at all, this aspect of the methods and systems herein compensates for the lack of tag-reading capability in the mobile device.

As noted above, various methods herein read a machine identification code from a machine identification code device of a processing machine, using a wireless reader of a portable computerized device, while the portable computerized device is positioned at a location that is within a predetermined distance from the machine. Such methods automatically sense current environmental conditions of the location, using sensors of the portable computerized device and automatically calculate a current location-based environmental signature based on the current environmental conditions sensed by the sensors, using a processor of the portable computerized device.

Also, such methods automatically obtain a previously stored location-based environmental signature associated with the machine identification code from a non-transitory computer readable storage medium, using a communications device of the portable computerized device. Further, such methods automatically compare the current location-based environmental signature with the previously stored location-based environmental signature to determine a similarity measure of the current location-based environmental signature and the previously stored location-based environmental signature, using the processor. These methods automatically verify whether the machine identification code is in the correct location based on the similarity measure being above a predetermined threshold, using the processor. Such methods also display a machine identification validity message on a graphic user interface of the portable computerized device based on the process of verifying the machine identification code determining that the machine identification code is in the correct location.

FIG. 1 is flowchart illustrating exemplary methods herein. In item 150, these methods install or activate a machine identification code device attached to a machine. This machine identification code device can comprise, for example, a magnetic device (iron oxide device), a radio frequency device (RFID device, Wi-Fi device, Bluetooth device, etc.) an optical device (barcode, QR code, glyphs, etc.), etc.

These methods read a machine identification code (sometimes referred to herein as a "tag") from the machine identification code device of the machine using a first wireless reader of a first portable computerized device. For example, the arbitrarily named "first" portable computerized device can be a smart phone or PDA of an administrator or service engineer who is performing the initial setup of the machine identification code. The machined indication code will be read while the first portable computerized device is positioned at a location that is within a predetermined distance (e.g., 5 meters, 1 meter, 10 centimeters, etc.) from the machine in item 152. For example, some protocols such as NFC require that the portable device be very close (less than 1 meter) while other protocols such as Bluetooth or Wi-Fi allow greater distances.

Further, in item 154, these methods automatically sense present environmental conditions (e.g., the lighting level, the sound level, the temperature, the altitude, the barometric pressure, compass heading, a wireless signal strength, a wireless signal type, etc.) of the location of the machine that were present while reading the machine identification code (using first sensors of the first portable computerized device). Then, in item 156, these methods automatically calculate a location-based environmental signature based on the present environmental conditions sensed by the first sensors (using a first processor of the first portable computerized device).

Then, in item 158, such methods can automatically save the location-based environmental signature (referred to herein as the "previously stored" location-based environmental signature for convenience) in a non-transitory computer readable storage medium (computer storage) using a first communications device of the first portable computerized device. The process of storing the location-based environmental signature in item 158 also includes a process of associating the previously stored location-based environmental signature with the machine identification code (thereby allowing identification of the previously stored location-based environmental signature to retrieve the machine identification code, and vice versa). This completes the initial setup process for the machine identification code device that is attached to the machine.

Once the initial setup process is complete, users will want to verify that the machine identification code is properly associated with the machine that they are proximate to (that they are next to, or our standing in front of) and has not been tampered with or moved. Therefore, these methods then read a possibly matching machine identification code from the machine identification code device of the machine in item 160, using a second wireless reader of a second portable computerized device, while the second portable computerized device is positioned at a second location that is also within the predetermined distance from the machine.

These methods automatically sense current environmental conditions of the second location in item 162, using second sensors of the second portable computerized device and automatically calculate a current location-based environmental signature based on the current environmental conditions sensed by the second sensors in item 164, using a second processor of the second portable computerized device.

Such methods also automatically obtain the previously stored location-based environmental signature associated with the possibly matching machine identification code from the non-transitory computer readable storage medium in item 166, using a second communications device of the second portable computerized device.

Thus, these methods can automatically compare the current location-based environmental signature with the previously stored location-based environmental signature to determine a similarity measure of the location-based environmental signatures (of the current location-based environmental signature and the previously stored location-based environmental signature) in item 168, using the second processor.

When working with the current location-based environmental signature, the methods and systems herein automatically compensate for differences between the sensors of the administrators device (first portable computerized device) used to create the previously stored location-based environmental signature and the user's device (second portable computerized device). Therefore, for example, if the second portable computerized device contains less sensors (or less accurate sensors) from the first portable computerized device, the systems and methods herein automatically adjust (or remove) the value of the readings from sensors that are different on the two different devices. For example, if the first portable computerized device included an altimeter, but the second portable computerized device did not include an altimeter, the altimeter contribution to the previously stored location-based environmental signature would be adjusted out to make the two different signatures more easily comparable. Those ordinarily skilled in the art would understand that other similar adjustments can be made to the different signatures to make them more easily comparable.

Then, such methods automatically verify whether the possibly matching machine identification code is in the correct location based on the similarity measure being above a predetermined threshold in item 170, using the second processor. For example, the verification process in item 170 can establish a percentage probability that the signatures match as the similarity measure. If the percentage probability (similarity measure) is above a certain amount (75%) the signatures can be considered matching. As would be understood by those ordinarily skilled in the art, different matching criteria can be utilized and the predetermined threshold (such as the 75%, mentioned above) can be adjusted (and potentially user-adjusted) depending upon the accuracy level required.

Further, such methods can display a machine identification validity message on a second graphic user interface of the second portable computerized device based on the process of verifying the possibly matching machine identification code determining that the possibly matching machine identification code is in the correct location in item 172. Therefore, continuing with the previous example, the graphic user interface of the second portable computerized device could display the percentage probability that the signatures match as well as an indication to the user that such a percentage probability is considered to be (or not to be) a valid match, thereby indicating whether the machine verification code is properly associated with that location.

Additionally, these methods can refine the previously stored location-based environmental signature based on multiple current location-based environmental signatures obtained as the users perform multiple processes of verifying the possibly matching machine identification code in item 174. Thus, as mentioned above, every time a mobile device utilizes the tag, the existing environmental signature may also be refined to reflect the latest environmental condition sensed by the most recent user(s), using an appropriate smoothing process (if desired).

If the process of reading the possibly matching machine identification code fails in item 160, or the process of verifying the possibly matching machine identification code in item 170 determines that the possibly matching machine identification code is in an incorrect location, these methods can still obtain the correct machine identification code for the user using the processing shown in items 176-180 (note that the dashed lines in FIG. 1 indicate that such processing is optional). Specifically, these methods can match the current location-based environmental signature (for display item 164) to one of a plurality of previously stored location-based environmental signatures maintained in the non-transitory computer readable storage medium in item 176, using the second processor and the second communications device. Thus, these methods obtain a valid machine identification code associated with the matching previously stored location-based environmental signature from the non-transitory computer readable storage medium in item 178, using the second processor and the second communications device and output the valid machine identification code from the second processor in item 180.

Figure 2:
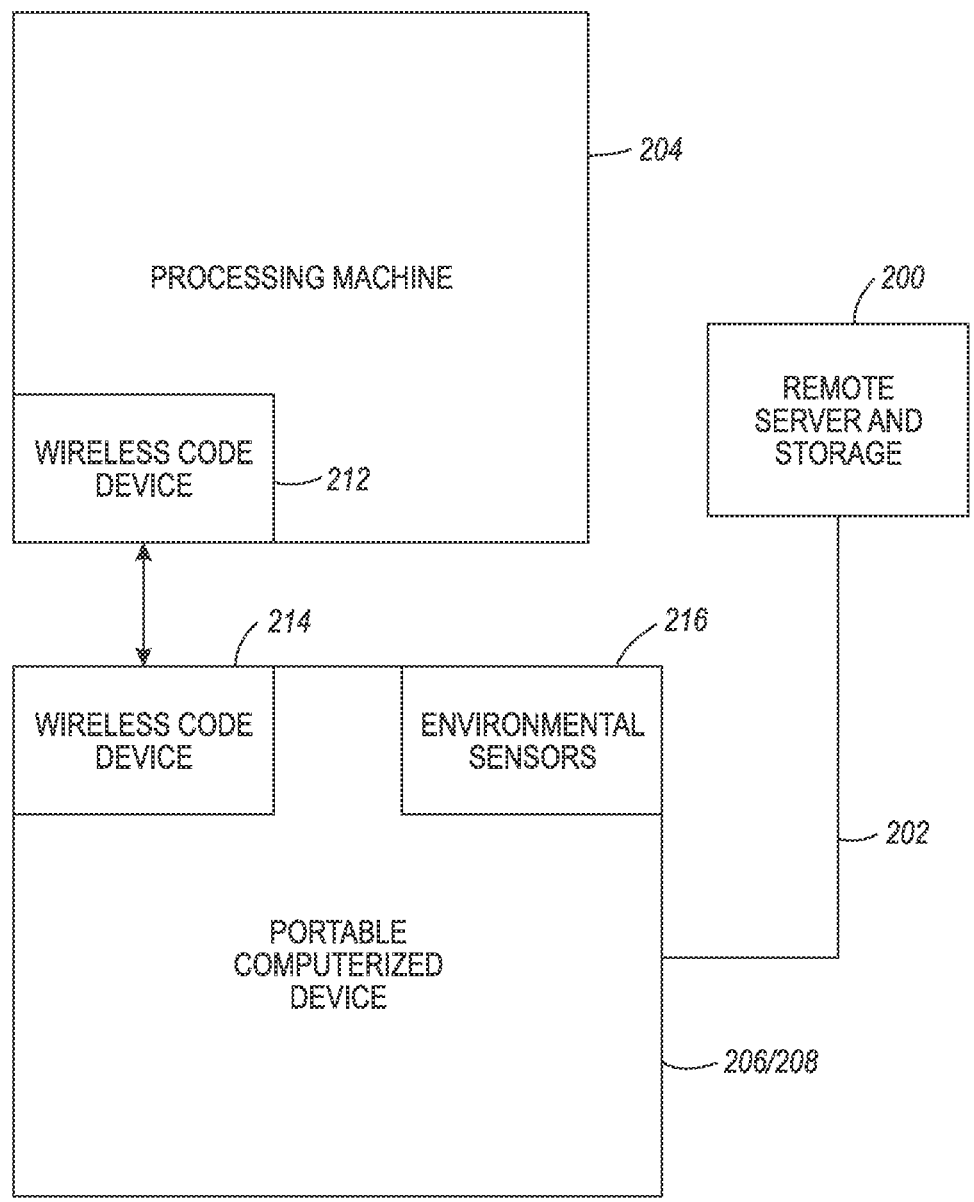
FIG. 2 is a schematic diagram illustrating devices herein.

As shown in FIG. 2, a processing machine 204 (which can be any form of machine that performs a process, such as a printing device, copying device, scanning device, bookmaking device, gaming device, manufacturing device, cleaning device, security device, access device, etc.) is within a predetermined distance of a portable computerized device 206/208, as discussed above. The processing machine 204 includes the wireless machine identification code device 212 that maintains the machine identification code mentioned above. FIG. 2 also illustrates a remote server 200 (having storage) connected to the portable computerized device 206/208 by way of a wired or wireless network 202.

Further, the portable computerized device 206/208 includes a wireless reader 214 that can read the machine identification code from the machine identification code device 212, as discussed above. Additionally, the environmental sensors are shown as item 216 in the portable computerized device 206/208. Again, these environmental sensors 216 can detect the lighting level, the sound level, the temperature, the altitude, the barometric pressure, compass heading, a wireless signal strength, a wireless signal type. Therefore these environmental sensors 216 can comprise optical detectors, audio detectors, thermometers, altimeters, barometers, compasses, wireless antenna, etc.

Figure 3:
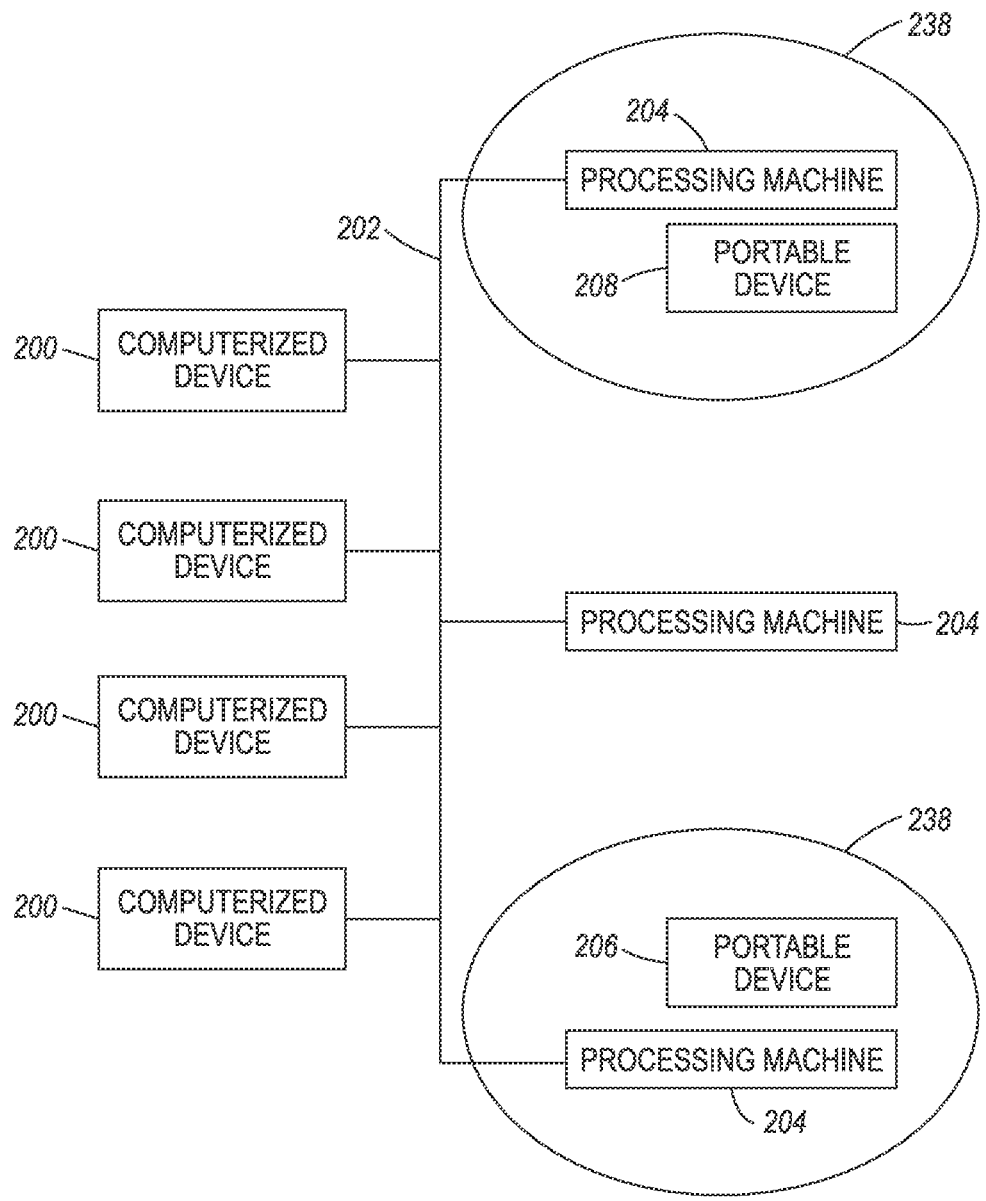
FIG. 3 is a schematic diagram illustrating systems herein.

As shown in FIG. 3, exemplary system systems and methods herein include various computerized devices 200, 204, 206, 208 located at various different physical locations. The computerized devices can include print servers, printing devices, personal computers, smartphones, etc., and are in communication (operatively connected to one another) by way of a local or wide area (wired or wireless) network 202.

Figure 4:
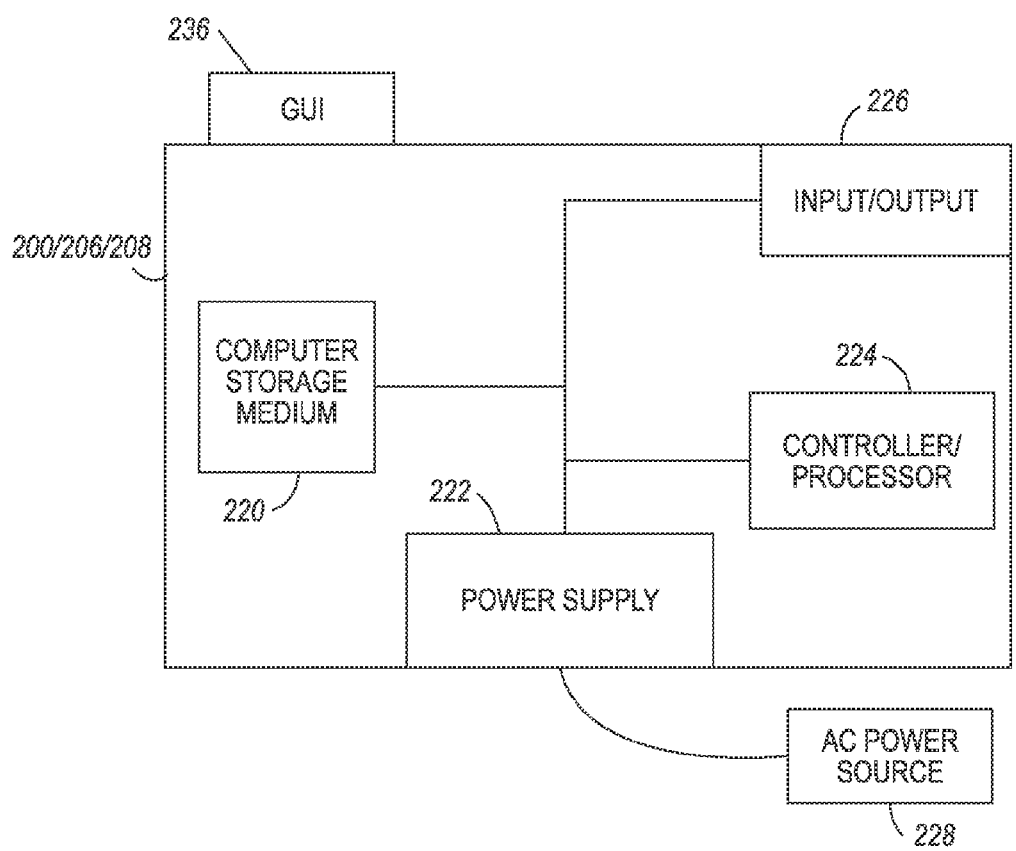
FIG. 4 is a schematic diagram illustrating devices herein.

FIG. 4 illustrates a computerized device 200, 206, 208, which can be used with systems and methods herein and can comprise, for example, a print server, a personal computer, a portable computing device, bookmaking device, gaming device, manufacturing device, cleaning device, security device, access device, etc. The computerized devices 200, 206, 208, each include a controller/processor 224 and a communications port (input/output) 226 operatively connected to the processor 224 and to the computerized network 202 external to the computerized device 200, 206, 208. Also, the computerized device 200, 206, 208, can include at least one accessory functional component, such as a graphic user interface assembly 236 that also operate on the power supplied from the external power source 228 (through the power supply 222).

The input/output device 226 is used for communications to and from the computerized device 200, 206, 208. The processor 224 controls the various actions of the computerized device. A non-transitory computer storage medium device 220 (which can be optical, magnetic, capacitor based, etc.) is readable by the processor 224 and stores instructions (that can be in the form of computer programs, applications, apps, etc.) that the processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 5:
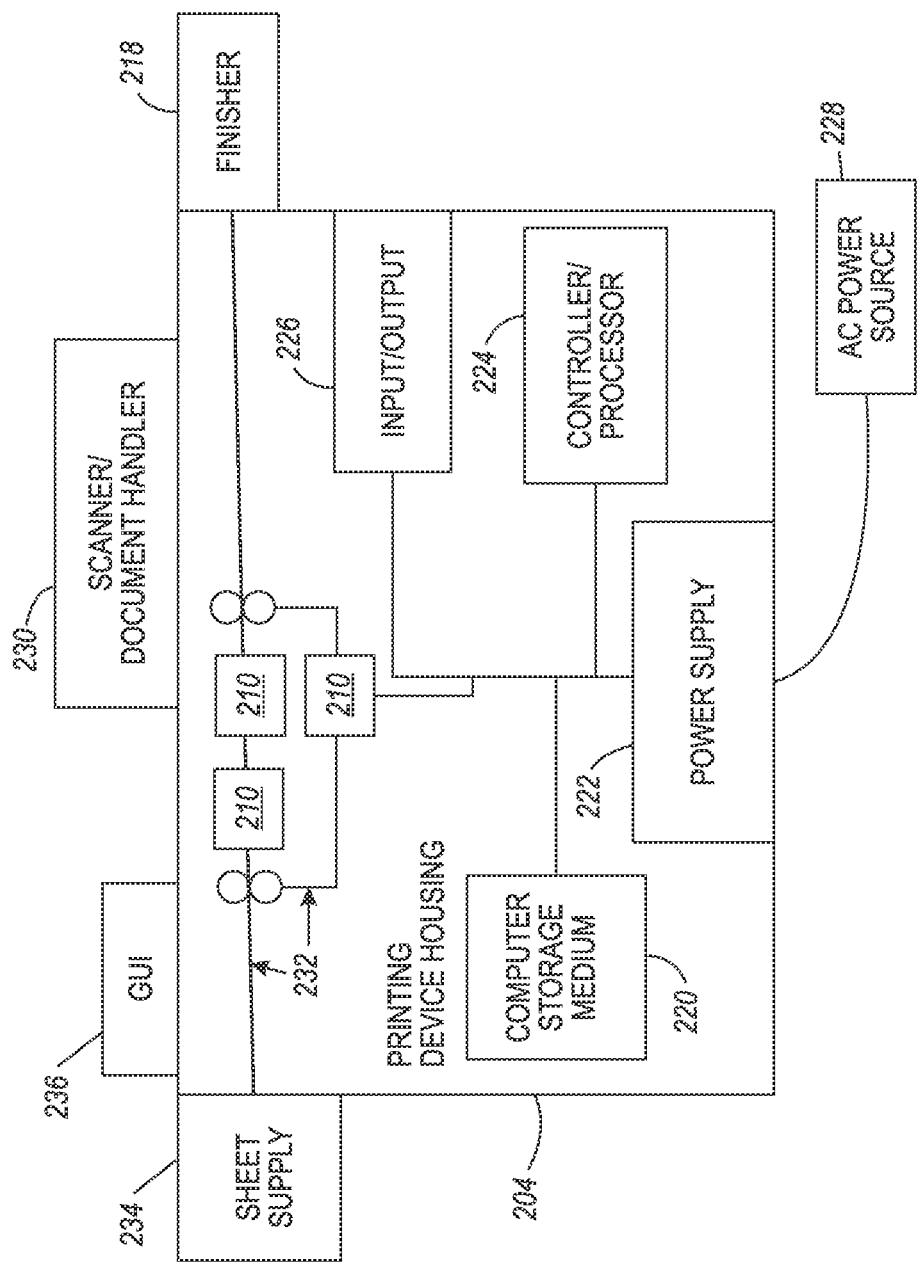
FIG. 5 is a schematic diagram illustrating devices herein.

FIG. 5 illustrates a computerized device that is a processing machine 204, such as a printing device, which can be used with systems and methods herein and can comprise, for example, a printer, copier, multi-function machine, multi-function device (MFD), etc. The processing machine 204 includes all of the components mentioned above and at least one marking device (printing engines) 210 operatively connected to the processor 224, a media path 232 positioned to supply sheets of media from a sheet supply 234 to the marking device(s) 210, etc. After receiving various markings from the printing engine(s), the sheets of media can optionally pass to a finisher 218 which can fold, staple, sort, etc., the various printed sheets. Also, the processing machine 204 can include at least one accessory functional component (such as a scanner/document handler 230, etc.) that also operates on the power supplied from the external power source 228 (through the power supply 222).

Thus, as explained above, exemplary portable computerized devices herein comprise a wireless reader that reads a machine identification code from a machine identification code device of a machine while the portable computerized device is positioned at a location that is within a predetermined distance from the machine. The portable computerized devices include sensors operatively (meaning directly or indirectly) connected to the wireless reader. The sensors automatically sense current environmental conditions of the location of the machine. The portable computerized devices include a processor operatively connected to the sensors. The processor automatically calculates a "current location-based environmental signature" based on the current environmental conditions sensed by the sensors.

Also, the portable computerized devices include a communications device operatively connected to the processor. The communications device automatically obtains a previously stored "location-based environmental signature" associated with the machine identification code from a non-transitory computer readable storage medium. The processor automatically compares the current location-based environmental signature with the previously stored location-based environmental signature to determine a similarity measure of the current location-based environmental signature and the previously stored location-based environmental signature.

The processor automatically verifies whether the machine identification code is in the correct location based on the similarity measure being above a predetermined threshold, using the processor. The portable computerized devices further include a graphic user interface operatively connected to the processor. The graphic user interface displays a machine identification validity message based on the processor determining that the machine identification code is in the correct location.

Thus, exemplary systems herein comprise a first portable computerized device 208 and a set of computer-executable instructions stored on the computer storage medium 220. The first portable computerized device 208 includes a first wireless reader 214 (e.g., an optical reader 214, a magnetic reader 214, a radio-frequency reader 214, etc.). Responsive to computer-executable instructions maintained on the non-transitory computer readable storage medium 220, the first wireless reader 214 reads machine identification code from a machine identification code device 212 of a processing machine 204 while the first portable computerized device 208 is positioned at a location that is within a predetermined distance 238 from the processing machine 204.

Further, the first portable computerized device 208 includes first sensors 216 operatively connected to the first wireless reader 214. Responsive to the computer-executable instructions maintained on the non-transitory computer readable storage medium 220, the first sensors 216 automatically sense present environmental conditions (e.g., the lighting level, the sound level, the temperature, the altitude, the barometric pressure, compass heading, a wireless signal strength, a wireless signal type, etc.) of the location that were present while installing or activating the machine identification code device that is attached to the processing machine 204.

The first portable computerized device 208 includes a first processor 224 operatively connected to the first sensors 216. Responsive to the computer-executable instructions maintained on the non-transitory computer readable storage medium 220, the processor 224 automatically calculates a previously stored location-based environmental signature based on the present environmental conditions sensed by the first sensors 216. The first portable computerized device 208 includes a first communications device 226 operatively connected to the processor 224. The first communications device 226 automatically stores the previously stored location-based environmental signature in a non-transitory computer readable storage medium 220 of one of the server-type computerized devices 200. When storing the previously stored location-based environmental signature, the first communications device 226 also associates the previously stored location-based environmental signature with the machine identification code of the processing machine 204 and this association is also saved on the non-transitory computer readable storage medium 220 of one of the server-type computerized devices 200 so that both the signature and association are available to all devices that can connect to the network 202.

After the first portable computerized device 208 has stored the signature and association on the non-transitory computer readable storage medium 220 of one of the server-type computerized devices 200, computer-executable instructions on the non-transitory computer readable storage medium 220 of a second portable computerized device 206 cause a second wireless reader 214 of the second portable computerized device 206 to read a possibly matching machine identification code from the machine identification code device 212 of the machine (while the second portable computerized device 206 is positioned at a second location that is within the predetermined distance 238 from the machine). The computer-executable instructions also cause second sensors 216 of the second portable computerized device 206 to automatically sense current environmental conditions of the second location.

The computer-executable instructions cause a second processor 224 of the second portable computerized device 206 to automatically calculate a current location-based environmental signature based on the current environmental conditions sensed by the second sensors 216. The computer-executable instructions cause a second communications device 226 of the second portable computerized device 206 to automatically obtain the previously stored location-based environmental signature associated with the possibly matching machine identification code from the non-transitory computer readable storage medium 220.

The computer-executable instructions cause the second processor 224 to automatically compare the current location-based environmental signature with the previously stored location-based environmental signature to determine a similarity measure of the current location-based environmental signature and the previously stored location-based environmental signature. The computer-executable instructions also cause the second processor 224 to automatically verify whether the possibly matching machine identification code is in a correct location based on the similarity measure being above a predetermined threshold. Further, the computer-executable instructions cause a second graphic user interface of the second portable computerized device 206 to display a machine identification validity message based on the second processor 224 determining that the possibly matching machine identification code is in the correct location.

In addition, if the second wireless reader 214 fails to read the possibly matching machine identification code or the second processor 224 determines that the possibly matching machine identification code is in an incorrect location, the computer-executable instructions can cause further processing. For example, the computer-executable instructions can cause the second processor 224 and the second communications device 226 to match the current location-based environmental signature to one of the previously stored location-based environmental signatures maintained in the non-transitory computer readable storage medium 220. The computer-executable instructions can also cause the second processor 224 and the second communications device 226 to obtain a valid machine identification code associated with the matching previously stored location-based environmental signature from the non-transitory computer readable storage medium 220. The computer-executable instructions can cause the second processor 224 to output the valid machine identification code.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A portable computerized device comprising:
    a wireless reader reading a machine identification code from a machine identification code device of a machine while said portable computerized device is positioned at a location that is within a predetermined distance from said machine;
    sensors operatively connected to said wireless reader, said sensors automatically sensing current environmental conditions of said location;
    a processor operatively connected to said sensors, said processor automatically calculating a current location-based environmental signature based on said current environmental conditions sensed by said sensors;

a communications device operatively connected to said processor, said communications device automatically obtaining a previously stored location-based environmental signature associated with said machine identification code from a non-transitory computer readable storage medium, said processor automatically comparing said current location-based environmental signature with said previously stored location-based environmental signature to determine a similarity measure of said current location-based environmental signature and said previously stored location-based environmental signature, and said processor automatically verifying whether said machine identification code is in a correct location based on said similarity measure being above a predetermined threshold, using said processor; and a graphic user interface operatively connected to said processor, said graphic user interface displaying a machine identification validity message based on said processor determining said machine identification code is in said correct location.

2. The portable computerized device according to claim 1, said wireless reader comprising one of an optical reader, a magnetic reader, and a radio-frequency reader.

3. The portable computerized device according to claim 1, said environmental conditions comprising at least one of: a lighting level, a sound level, a temperature, an altitude, a barometric pressure, compass heading, a wireless signal strength, a wireless signal type, and a global positioning system geographic location.

4. The portable computerized device according to claim 1, said processor and communications device matching said current location-based environmental signature to a matching previously stored location-based environmental signature of a plurality of previously stored location-based environmental signatures maintained in said non-transitory computer readable storage medium, said processor and communications device obtaining a valid machine identification code associated with said matching previously stored location-based environmental signature from said non-transitory computer readable storage medium, and said processor outputting said valid machine identification code.

5. The portable computerized device according to claim 4, said processor and communications device performing said matching said current location-based environmental signature and said obtaining said valid machine identification code, and said processor performing said outputting said valid machine identification code based on at least one of:

said wireless reader failing to read said machine identification code; and said processor determining said machine identification is in an incorrect location.

6. A system comprising:

a first portable computerized device and a set of computer-executable instructions, said first portable computerized device comprising:

a first wireless reader reading machine identification code from a machine identification code device of a machine while said first portable computerized device is positioned at a location that is within a predetermined distance from said machine;

first sensors operatively connected to said first wireless reader, said first sensors automatically sensing present environmental conditions of said location that were present while one of installing and activating said machine identification code attached to said machine;

a first processor operatively connected to said first sensors, said processor automatically calculating a previously stored location-based environmental signature based on said present environmental conditions sensed by said first sensors; and a first communications device operatively connected to said processor, said first communications device automatically storing said previously stored location-based environmental signature in a non-transitory computer readable storage medium, said storing said previously stored location-based environmental signature further comprising associating said previously stored location-based environmental signature with said machine identification code, said computer-executable instructions causing:

a second wireless reader of a second portable computerized device to read a possibly matching machine identification code from a machine identification code device of said machine while said second portable computerized device is positioned at a second location that is within said predetermined distance from said machine;

second sensors of said second portable computerized device to automatically sense current environmental conditions of said second location;

a second processor of said second portable computerized device to automatically calculate a current location-based environmental signature based on said current environmental conditions sensed by said second sensors;

a second communications device of said second portable computerized device to automatically obtain said previously stored location-based environmental signature associated with said possibly matching machine identification code from said non-transitory computer readable storage medium;

said second processor to automatically compare said current location-based environmental signature with said previously stored location-based environmental signature to determine a similarity measure of said current location-based environmental signature and said previously stored location-based environmental signature;

said second processor to automatically verify whether said possibly matching machine identification code is in a correct location based on said similarity measure being above a predetermined threshold; and a second graphic user interface of said second portable computerized device to display a machine identification validity message based on said second processor determining said possibly matching machine identification code is in said correct location.

7. The system according to claim 6, said first wireless reader and said second wireless reader each comprising one of an optical reader, a magnetic reader, and a radio-frequency reader.

8. The system according to claim 6, said environmental conditions comprising at least one of: a lighting level, a sound level, a temperature, an altitude, a barometric pressure, compass heading, a wireless signal strength, a wireless signal type, and a global positioning system geographic location.

9. The system according to claim 6, said computer-executable instructions further causing:

said second processor and said second communications device to match said current location-based environmental signature to a matching previously stored location-based environmental signature of a plurality of previously stored location-based environmental signatures maintained in said non-transitory computer readable storage medium;

said second processor and said second communications device to obtain a valid machine identification code associated with said matching previously stored location-based environmental signature from said non-transitory computer readable storage medium; and said second processor to output said valid machine identification code.

10. The system according to claim 9, said computer-executable instructions causing said matching said current location-based environmental signature, said obtaining said valid machine identification code, and said outputting said valid machine identification code based on at least one of:

said second wireless reader failing to read said possibly matching machine identification code; and said second processor determining said possibly matching machine identification code is in an incorrect location.

11. A method comprising:

reading a machine identification code from a machine identification code device of a machine, using a wireless reader of a portable computerized device, while said portable computerized device is positioned at a location that is within a predetermined distance from said machine;

automatically sensing current environmental conditions of said location, using sensors of said portable computerized device;

automatically calculating a current location-based environmental signature based on said current environmental conditions sensed by said sensors, using a processor of said portable computerized device;

automatically obtaining a previously stored location-based environmental signature associated with said machine identification code from a non-transitory computer readable storage medium, using a communications device of said portable computerized device;

automatically comparing said current location-based environmental signature with said previously stored location-based environmental signature to determine a similarity measure of said current location-based environmental signature and said previously stored location-based environmental signature, using said processor;

automatically verifying whether said machine identification code is in a correct location based on said similarity measure being above a predetermined threshold, using said processor; and displaying a machine identification validity message on a graphic user interface of said portable computerized device based on said verifying said machine identification code determining said machine identification code is in said correct location.

12. The method according to claim 11, further comprising refining said previously stored location-based environmental signature based on multiple current location-based environmental signatures.

13. The method according to claim 11, said environmental conditions comprising at least one of: a lighting level, a sound level, a temperature, an altitude, a barometric pressure, compass heading, a wireless signal strength, a wireless signal type, and a global positioning system geographic location.

14. The method according to claim 11, further comprising:

matching said current location-based environmental signature to a matching previously stored location-based environmental signature of a plurality of previously stored location-based environmental signatures maintained in said non-transitory computer readable storage medium, using said processor and said communications device;

obtaining a valid machine identification code associated with said matching previously stored location-based environmental signature from said non-transitory computer readable storage medium, using said processor and said communications device; and outputting said valid machine identification code from said processor.

15. The method according to claim 14, said matching said current location-based environmental signature, said obtaining said valid machine identification code, and said outputting said valid machine identification code being performed based on at least one of:

said reading said machine identification code failing to read said machine identification code; and said verifying said machine identification code determining said machine identification is in an incorrect location.

16. A method comprising:

one of installing and activating a machine identification code device attached to a machine;

reading a machine identification code from said machine identification code device of said machine, using a first wireless reader of a first portable computerized device, while said first portable computerized device is positioned at a location that is within a predetermined distance from said machine;

automatically sensing present environmental conditions of said location that were present while performing said reading said machine identification code, using first sensors of said first portable computerized device;

automatically calculating a previously stored location-based environmental signature based on said present environmental conditions sensed by said first sensors, using a first processor of said first portable computerized device;

automatically storing said previously stored location-based environmental signature in a non-transitory computer readable storage medium, using a first communications device of said first portable computerized device, said storing said previously stored location-based environmental signature further comprising associating said previously stored location-based environmental signature with said machine identification code;

reading a possibly matching machine identification code from said machine, using a second wireless reader of a second portable computerized device, while said second portable computerized device is positioned at a second location that is within said predetermined distance from said machine;

automatically sensing current environmental conditions of said second location, using second sensors of said second portable computerized device;

automatically calculating a current location-based environmental signature based on said current environmental conditions sensed by said second sensors, using a second processor of said second portable computerized device;

automatically obtaining said previously stored location-based environmental signature associated with said possibly matching machine identification code from said non-transitory computer readable storage medium, using a second communications device of said second portable computerized device;

automatically comparing said current location-based environmental signature with said previously stored location-based environmental signature to determine a similarity measure of said current location-based environmental signature and said previously stored location-based environmental signature, using said second processor;

automatically verifying whether said possibly matching machine identification code is in a correct location based on said similarity measure being above a predetermined threshold, using said second processor; and displaying a machine identification validity message on a second graphic user interface of said second portable computerized device based on said verifying said possibly matching machine identification code determining said possibly matching machine identification code is in said correct location.

17. The method according to claim 16, further comprising refining said previously stored location-based environmental signature based on multiple current location-based environmental signatures.

18. The method according to claim 16, said environmental conditions comprising at least one of: a lighting level, a sound level, a temperature, an altitude, a barometric pressure, compass heading, a wireless signal strength, a wireless signal type, and a global positioning system geographic location.

19. The method according to claim 16, further comprising:

matching said current location-based environmental signature to a matching previously stored location-based environmental signature of a plurality of previously stored location-based environmental signatures maintained in said non-transitory computer readable storage medium, using said second processor and said second communications device;

obtaining a valid machine identification code associated with said matching previously stored location-based environmental signature from said non-transitory computer readable storage medium, using said second processor and said second communications device; and outputting said valid machine identification code from said second processor.

20. The method according to claim 19, said matching said current location-based environmental signature, said obtaining said valid machine identification code, and said outputting said valid machine identification code being performed based on at least one of:

said reading said possibly matching machine identification code failing to read said possibly matching machine identification code; and said verifying said possibly matching machine identification code determining said possibly matching machine identification code is in an incorrect location.

* * * * *